United States Patent
Langston et al.

(10) Patent No.: US 12,337,941 B1
(45) Date of Patent: Jun. 24, 2025

(54) FLEXIBLE AND COMPRESSION-RESISTANT, THERMALLY-INSULATING COMPOSITE

(71) Applicant: United States of America as represented by the Secretary of the Navy, Arlington, VA (US)

(72) Inventors: Tye Langston, Lynn Haven, FL (US); David Swedberg, Panama City, FL (US)

(73) Assignee: The United States of America as represented by the Secretary of the Navy

(*) Notice: Subject to any disclaimer, the term of this patent is extended or adjusted under 35 U.S.C. 154(b) by 353 days.

(21) Appl. No.: 17/970,672

(22) Filed: Oct. 21, 2022

(51) Int. Cl.
*B63C 11/02* (2006.01)
*B32B 5/18* (2006.01)
*B32B 27/40* (2006.01)

(52) U.S. Cl.
CPC ............... *B63C 11/02* (2013.01); *B32B 5/18* (2013.01); *B32B 27/40* (2013.01); *B32B 2250/05* (2013.01); *B32B 2250/40* (2013.01); *B32B 2250/42* (2013.01); *B32B 2266/126* (2016.11); *B32B 2307/304* (2013.01); *B32B 2307/51* (2013.01); *B32B 2307/7242* (2013.01); *B32B 2307/73* (2013.01)

(58) Field of Classification Search
CPC ........... B63C 11/02; B32B 5/18; B32B 27/40; B32B 2250/05
See application file for complete search history.

(56) References Cited

U.S. PATENT DOCUMENTS 10,004,284 B2 * 6/2018 Spenser ............... A41D 13/012

* cited by examiner

*Primary Examiner* — Lawrence D Ferguson
(74) *Attorney, Agent, or Firm* — James M. Kasischke; Jeffry C. Severson

(57) ABSTRACT

A thermally-insulating composite includes a first skin, a second skin, and a multi-layer core disposed between the first skin and second skin. The multi-layer core has a plurality of open-cell layers. Each open-cell layer includes a contiguous framework of open cells. A separating layer of gas impervious material is disposed between adjacent ones of the open-cell layers. Multiple keys extend through the multi-layer core with each key being uncoupled from the multi-layer core but coupled to the first skin and second skin.

28 Claims, 8 Drawing Sheets

FLEXIBLE AND COMPRESSION-RESISTANT, THERMALLY-INSULATING COMPOSITE

ORIGIN OF THE INVENTION

The invention described herein may be manufactured and used by or for the Government of the United States of America for Governmental purposes without payment of any royalties.

FIELD OF THE INVENTION

The invention relates generally to thermally-insulating materials, and more particularly to a thermally-insulating composite that is both flexible and compression-resistant such that it can be used in fabricating underwater dive suits.

BACKGROUND OF THE INVENTION

Dive suits are vitally important for nearly all naval, commercial, and recreational diving events as these suits must protect divers from cold-water-induced functioning impairments, safety issues, and injuries. Furthermore, the deeper a dive, the longer the time it takes for a diver to safely surface thereby increasing the time a diver must spend in cold water environs.

Two well-known thermal protection dive suits are wetsuits and dry suits, both of which allow swimmers and divers to withstand exposure to colder waters for longer periods of time than a person could tolerate without the suit. On a basic level, a wetsuit is a form-fitting layer of insulation. True to its name, the wetsuit allows water inside the garment such that a thin layer of water is trapped between the suit and a person's skin. With a proper fit, very little circulation and replacement of the trapped water occurs and it heats up to form a warm water jacket around the wearer. Allowing a wetsuit to flood with water provides distinct advantages over drysuits. First, the water layer does not affect the suit's buoyancy the way trapped air would. Second, there is no need to maintain waterproof seals for warmth. The two important factors affecting a wetsuit's performance are the suit's fit and the materials used to make the suit. An excellent fit is required to prevent flushing and replacement of warm water with cold water. The material must be an excellent insulator and possess the flexibility and durability to make it a wearable garment.

Dry suits provide thermal protection to divers by sealing trapped air inside the suit while preventing the influx of water into the suit. Dry suits are often less form fitting than wetsuits except at the seals, which are commonly located at the wrists, neck and ankles. With air on the inside of the suit, more thermal protection is achieved as compared to a wetsuit. However, dry suits still rely heavily on the insulation attributes of the materials used.

The primary material used to manufacture most wetsuits and many dry suits is foamed neoprene rubber because it is both thermally insulating and flexible. The insulating properties primarily arise from two properties of the foamed material. First, neoprene rubber itself has a low thermal conductivity (0.100-0.192 W/m·K). Second, "foaming" the neoprene introduces numerous small pockets of nitrogen gas or air in the neoprene. In order for heat to pass through the foamed material, it must repeatedly transition from solid to gaseous transport modes. Since the thermal conductivity of the trapped gas is three to seven times lower than that of the neoprene rubber, the gas pockets are primarily responsible for the foamed material's insulating ability.

Unfortunately, at increased depth and pressure, the internal gas pockets are compressed thereby leading to a denser material with less gas volume. In fact, it has been shown that a 5 millimeter (mm) thick sample of foamed neoprene exhibited decreases in porosity of 28% and 45% under pressures equal to 49 and 100 feet below the sea surface, respectively. Correspondingly, these reductions in porosity were found to result in increases in thermal conductivity of 21% and 42%. Furthermore, when a thicker foam neoprene material (e.g., 12 mm) was tested, the effect worsened as thermal conductivity increased, i.e., increases of 27% and 54% at 49 and 100 feet deep, respectively. See Bardy et al., "Thermal Conductivity and Compressive Strain of Foam Neoprene Insulation under Hydrostatic Pressure," J. Phys. D: Appl. Phys. 2005; 38:3832-40. Thus, the perceived thermal insulation benefit of foamed rubber dive suits at the surface of a body of water is actually reduced as water depth increases. Further, thermal protection losses increase with water depth when a thicker foamed rubber material is used. This trend is contradictory to a diver's needs since temperature generally drops with depth and dive suit designers tend to use thicker materials when more thermal protection is needed.

SUMMARY OF THE INVENTION

Accordingly, it is an object of the present invention to provide a thermally-insulating material.

Another object of the present invention is to provide a thermally-insulating material that maintains its thermal insulation properties at pressures and temperatures encountered throughout a diving-depth profile.

Still another object of the present invention is to provide a thermally-insulating material that is flexible and stretchy such that it readily conforms to a human body and retains its conformity throughout movements of the body.

Other objects and advantages of the present invention will become more obvious hereinafter in the specification and drawings.

In accordance with the present invention, a thermally-insulating composite includes a flexible first skin, a flexible second skin, and a flexible multi-layer core disposed between the first skin and second skin. The multi-layer core has a plurality of open-cell layers. Each open-cell layer includes a contiguous framework of open cells. A separating layer of gas impervious material is disposed between adjacent ones of the open-cell layers. Multiple keys extend through the multi-layer core. Each key is uncoupled from the multi-layer core and is coupled to the first skin and second skin.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
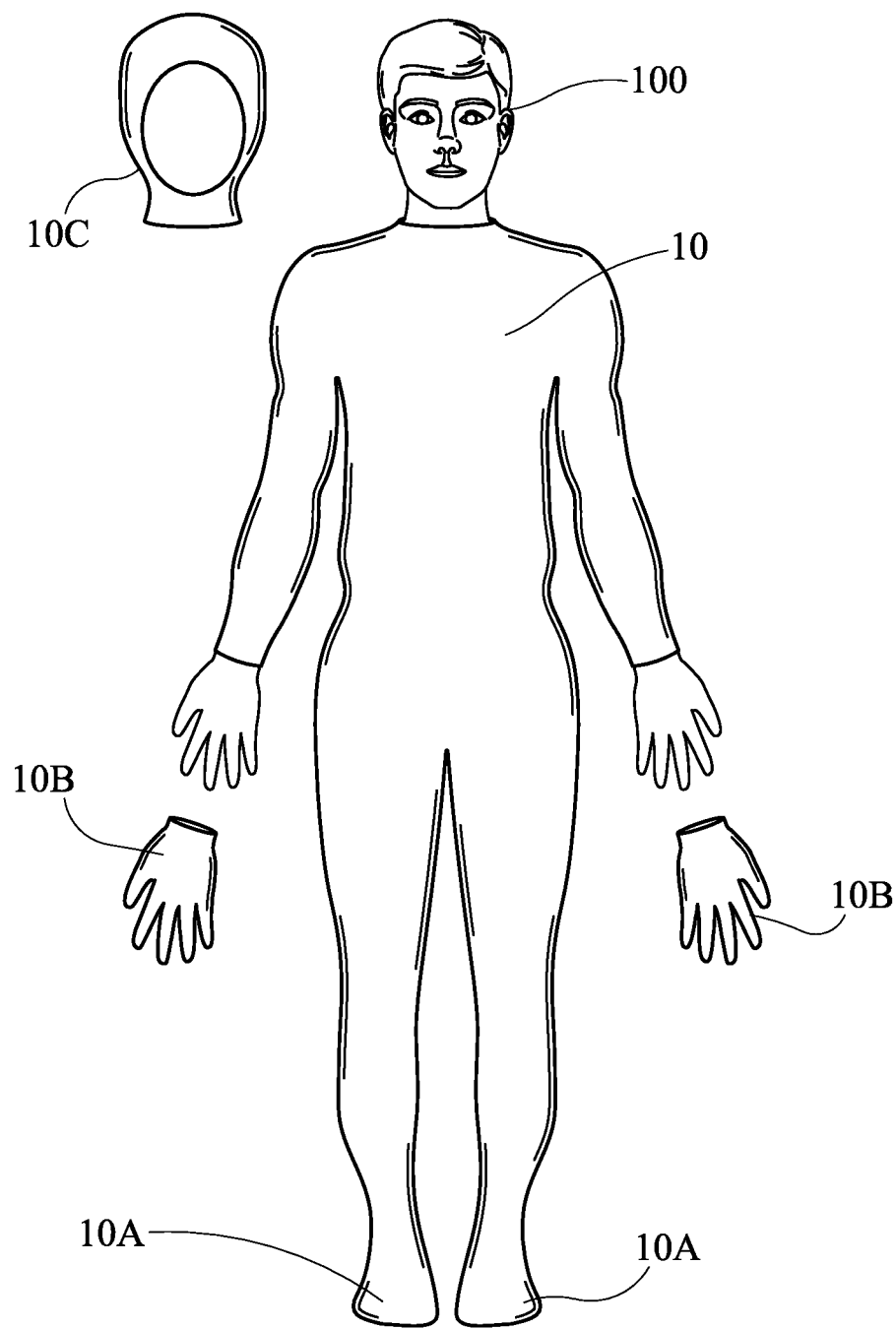
FIG. 1 is a schematic view of an underwater dive suit.

Referring now to the drawings and more particularly to FIG. 1, an underwater dive suit 10 is shown illustrated on a diver 100. Generally, dive suit 10 covers the torso and some or all of the arms and legs of diver 100. Dive suit 10 can also include one or more of booties 10A, gloves 10B, and a hood 10C. Booties 10A, gloves 10B, and hood 10C can be separate or integrated elements of dive suit 10. Dive suit 10 is representative of a wetsuit or a dry suit without departing from the scope of the present invention. In general, and as is well-known in the art, dive suit 10 should be made from flexible, stretchy, and form-fitting materials with at least some of the materials having thermal insulation properties that are ideally maintained throughout an expected dive-depth profile.

The present invention is a novel thermally-insulating composite that is both flexible and stretchy while also being compression resistant to avoid appreciable loss of its insulating properties. Thus, the composite's properties are well-suited for the construction of dive suits that must be form-fitting, flexible to allow for body movement, and capable of retaining their thermal insulation properties throughout a dive-depth profile. However, it is to be understood that the thermally-insulating composite of the present invention is not limited to use in dive suits as it can be used for any application requiring thermal insulation.

Figure 2:
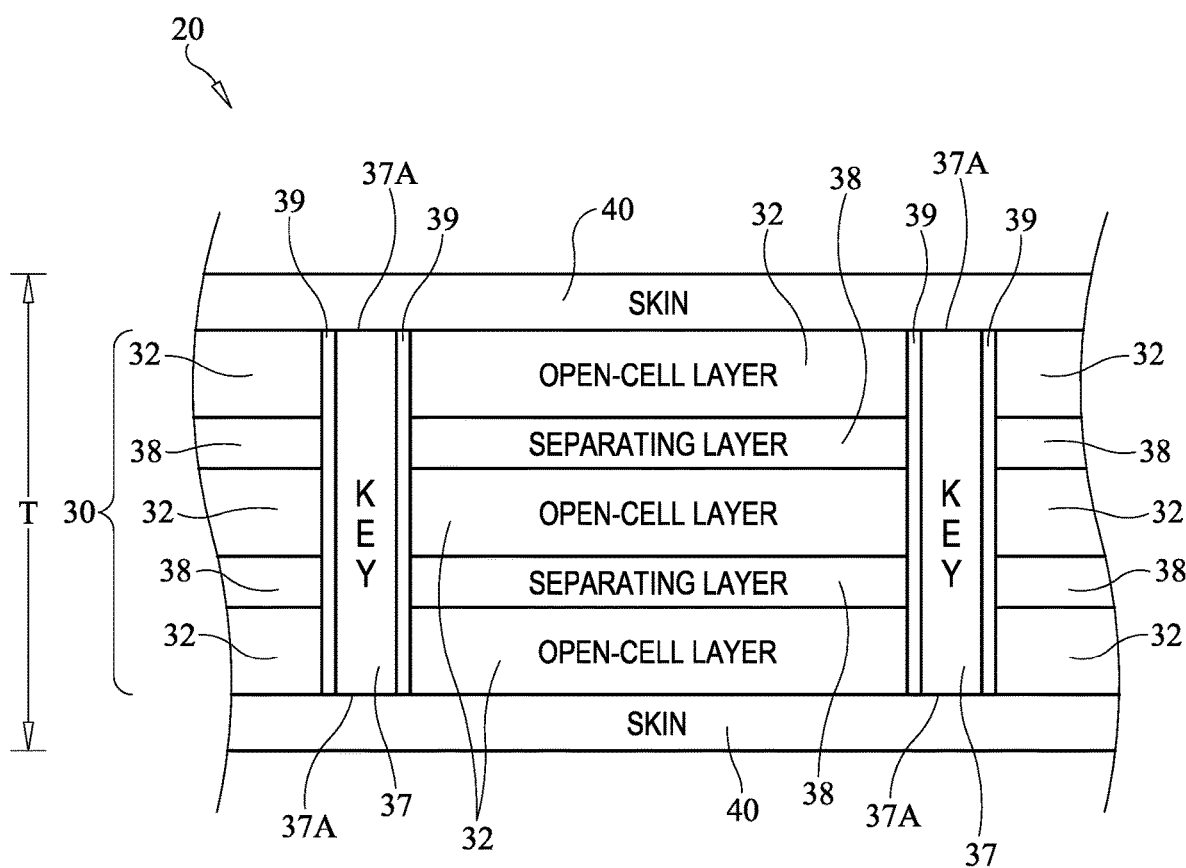
FIG. 2 is a schematic view of a portion of a thermally-insulating composite in accordance with an embodiment of the present invention.

Referring again to the drawings and more particularly to FIG. 2, a schematic view of a thermally-insulating composite in accordance with an embodiment of the present invention is shown and is referenced generally by numeral 20. Composite 20 is a multi-layer "sandwich" structure that includes a flexible, thermally-insulating multi-layer core 30 sandwiched between and encased by flexible skin layers 40 that are coupled to core 30. As will be explained further below, core 30 supports both in-plane stretching (i.e., core 30 and skins 40 stretch together along the planes of skins 40) and out-of-plane bending (i.e., core 30 and skins 40 flex/bend together out of the planes of skins 40). However, core 30 is resistant to compression in the thickness dimension "T" of composite 20. When used for dive suits, thickness dimension T will generally be on the order of 3-12 mm. However, it is to be understood that thickness dimension T can be greater or less depending on application requirements without departing from the scope of the present invention.

Core 30 is a multi-layer structure having multiple open-cell layers 32 and a solid separating layer 38 disposed between adjacent open-cell layers 32. Layers 32 and 38 are not coupled to one another throughout core 30. Further, the outermost ones of layers 32 are not coupled to skins 40. In the illustrated embodiment, three open-cell layers 32 are used in core 30 thereby dictating the use of two separating layers 38. As will be explained further below, a three open-cell layer embodiment allows the central one of layers 32 to act as a gas isolation zone that impedes heat transfer through the thickness dimension of core 30. However, it is to be understood that some embodiments of the present invention could utilize just two of layers 32 or more than three of layers 32 without departing form the scope of the present invention.

Figure 3:
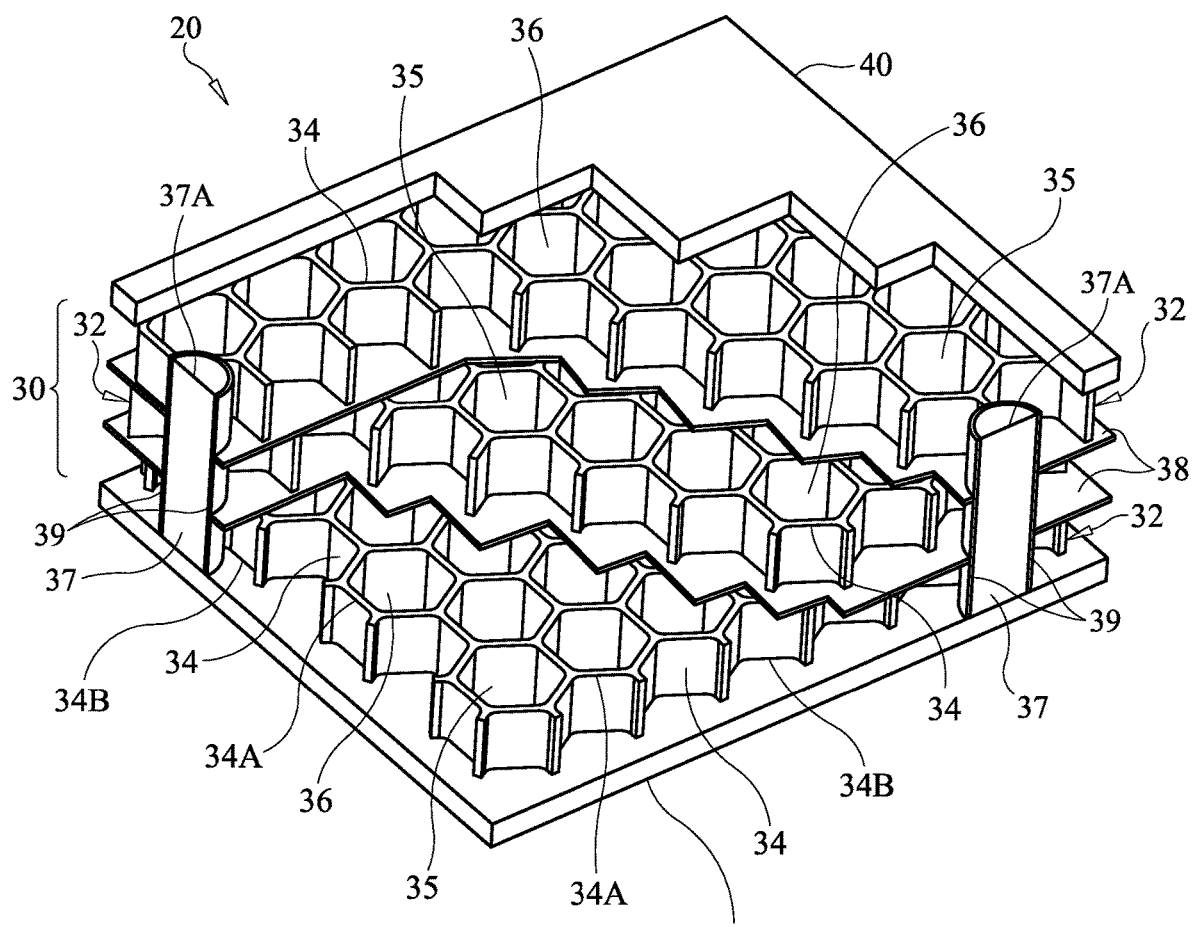
FIG. 3 is a cutaway perspective view of a portion of a thermally-insulating composite in accordance with an embodiment of the present invention.

Referring additionally now to FIG. 3, each open-cell layer 32 is a flexible framework constructed from a plurality of open-ended cells 34 coupled together in a contiguous fashion. Each cell 34 is open at its axial ends 34A and 34B. As mentioned above, each open-cell layer 32 stretches in the plane of skins 40 and flexes/bends out of the planes of skins 40. In the illustrated embodiment, the stretching and flexing of layer 32 is made possible by identical cells 34, each of which is hexagonal in cross-section such that layer 32 resembles a honeycomb. That is, each cell 34 shares its walls 35 with adjacent cells. It is to be understood that other cell cross-sectional shapes to include triangular or rectangular shapes could be used without departing from the scope of the present invention. Furthermore, more complex cell shapes could also be used to enhance the stretchiness of the composite as will be explained further below. Still further, each layer 32 for the composite can include a mixture of cell sizes and shapes without departing from the scope of the present invention.

In some embodiments of the present invention and as shown in the illustrated embodiment, cell walls 35 of open cells 34 are misaligned between adjacent layers 32. Such cell-wall misalignment enhances the incompressibility attributes of composite 20 through the thickness dimension thereof and minimizes bulging of adjacent separating layer(s) into adjacent open-cell layers' cells. Misalignment of cell walls also breaks up heat transfer paths between skins 40. Misalignment of cell walls between adjacent layers 32 can be achieved by changing sizes and/or shapes of open cells 34 between layers 32. Misalignment of cell walls between adjacent layers 32 can additionally or alternatively be achieved by the positioning of a layer 32 relative to its adjacent layer(s) 32.

Figure 4:
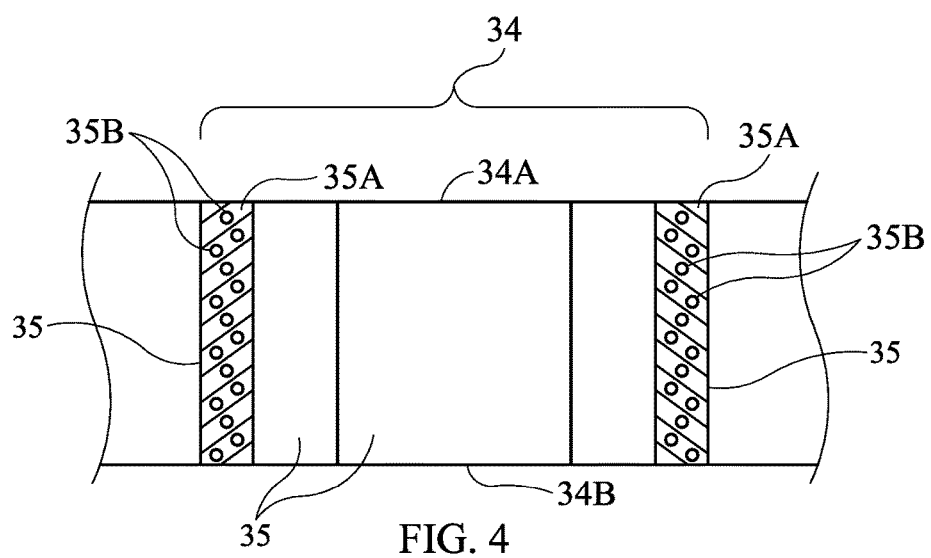
FIG. 4 is an enlarged cross-sectional view of one open-ended cell whose polymer walls have incompressible particles mixed therein in accordance with an embodiment of the present invention.

The material used for each open-cell layer 32 is generally a polymer (e.g., thermoplastic polymers, thermoset polymers, etc.) in order to support the stretching and flexing thereof. However, since the walls of cells 34 are aligned with the thickness dimension T of composite 20, each layer 32 resists compression forces aligned with thickness dimension T. In cases where additional compression resistance is required, the walls of cells 34 can be made from a polymer having incompressible materials mixed therein. This is illustrated in FIG. 4 where a cross-sectional view of a single cell 34 shows its walls 35 being constructed of a polymer material 35A with incompressible particles 35B being mixed therein. Particles 35B could be microballoons or aerogel particles of various diameters and/or volume fractions. In some embodiments of the present invention, incompressible particles 35B can be selected to have low thermal conductivity. For example, when composite 20 is to be used for dive suits that need to operate in deep-dive conditions, a good choice for particles 35B is phenolic resin microballoons.

Each of cells 34 can be filled (as indicated by numeral 36) with air or other gas. In some embodiments of the present invention, cells 34 can be filled with a deformable fill material that provides thermal insulation while supporting the stretching and flexing of layer 32. A variety of materials and/or particles can be used for such fill material provided they meet the above-stated criteria. Suitable examples include, but are not limited to, aerogels, microballoons, and elastic foams. In some embodiments of the present invention, one or more of layers 32 could have cells 34 filled with air/gas, while others of layers 32 have their cells 34 filled with one of the above-noted fill materials.

Each separating layer 38 is a flexible and stretchable material that is impervious to air or gas transmission. In some embodiments of the present invention, one or more of separating layer 38 can be configured to resist water penetration by being made of hydrophobic materials. One or more of separating layer 38 can be selected or configured to support movement of adjacent open-cell layers 32 by being composed of a material that provides lubricity through a lubricant that is mixed into the layer's compound during production. Suitable materials for each layer 38 can include, for example, flexible polymer rubbers such as neoprene, silicone, polytetrafluoroethylene (PTFE or Teflon), or internally-lubricated ethylene propylene diene monomer (EPDM), nitrile compounds, and the commercially-available Viton.

Flexible skins 40 are coupled to core 30. For underwater uses of composite 20, skins 40 are waterproof material(s) such as polyurethanes or rubbers. If needed, skins 40 could incorporate fiber and/or particle reinforcement for toughness or abrasion resistance. Skins 40 are coupled to core 30 using a plurality of keys 37 disposed in keyways 39. The number and placement of keys/keyways is not a limitation of the present invention. In general, keyways 39 are holes defined throughout core 30 that extend completely through the thickness dimension of core 30. Each of keyways 39 is sized and shaped to have a corresponding key 37 fitted therein. While keys 37 can come into contact with layers 32 and/or layers 38 at each keyway 39, keys 37 are not coupled to layers 32 or 38. That is, layers 32 and 38 can be stretched away from a key 37 during the stretching and/or bending of composite 20. Each key 37 can be a solid or hollow piece of low thermal conductivity material (e.g., syntactic foam, rubber, aerogels) whose cross-sectional geometry (e.g., cylindrical, triangular, rectangular, etc.) can be indexed to that of its keyway 39. Skins 40 are coupled to the axial ends 37A of keys 37 throughout composite 20 using, for example, an adhesive, a bonding technique (e.g., thermal fusing, using thermoplastics, etc.), stitching, fasteners, etc., the choice of which is not a limitation of the present invention. Separation between keys can be customized by location in composite 20. For example, keys can be positioned closer together for less planar flexibility and greater attachment strength between skins 40. The keys can be spaced farther apart when a greater degree of flexibility is required.

Figure 5A:
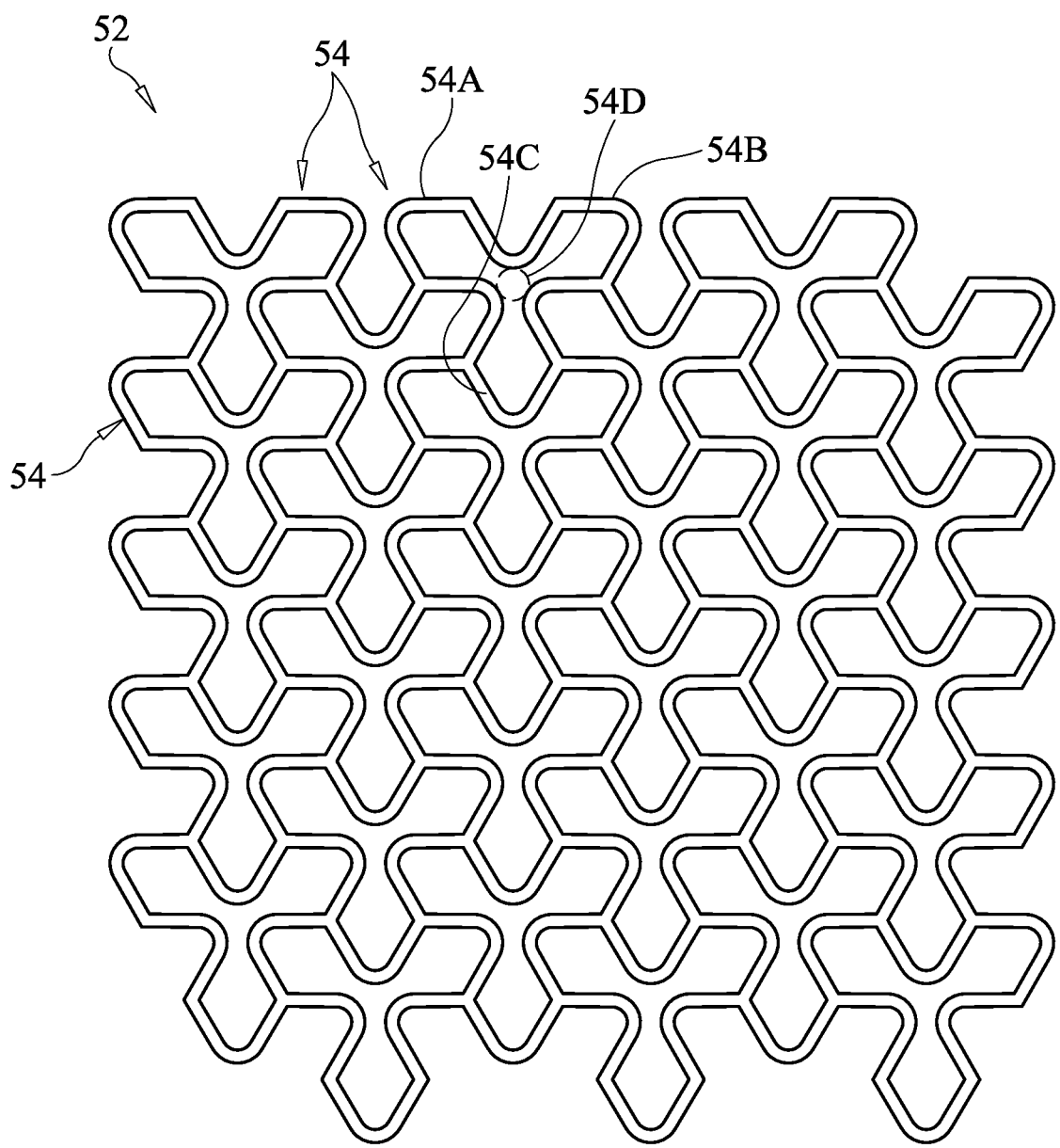
FIG. 5A is an isolated plan view of a flexible open-cell layer utilizing a three-leg open cell geometry in accordance with another embodiment of the present invention.
Figure 5B:
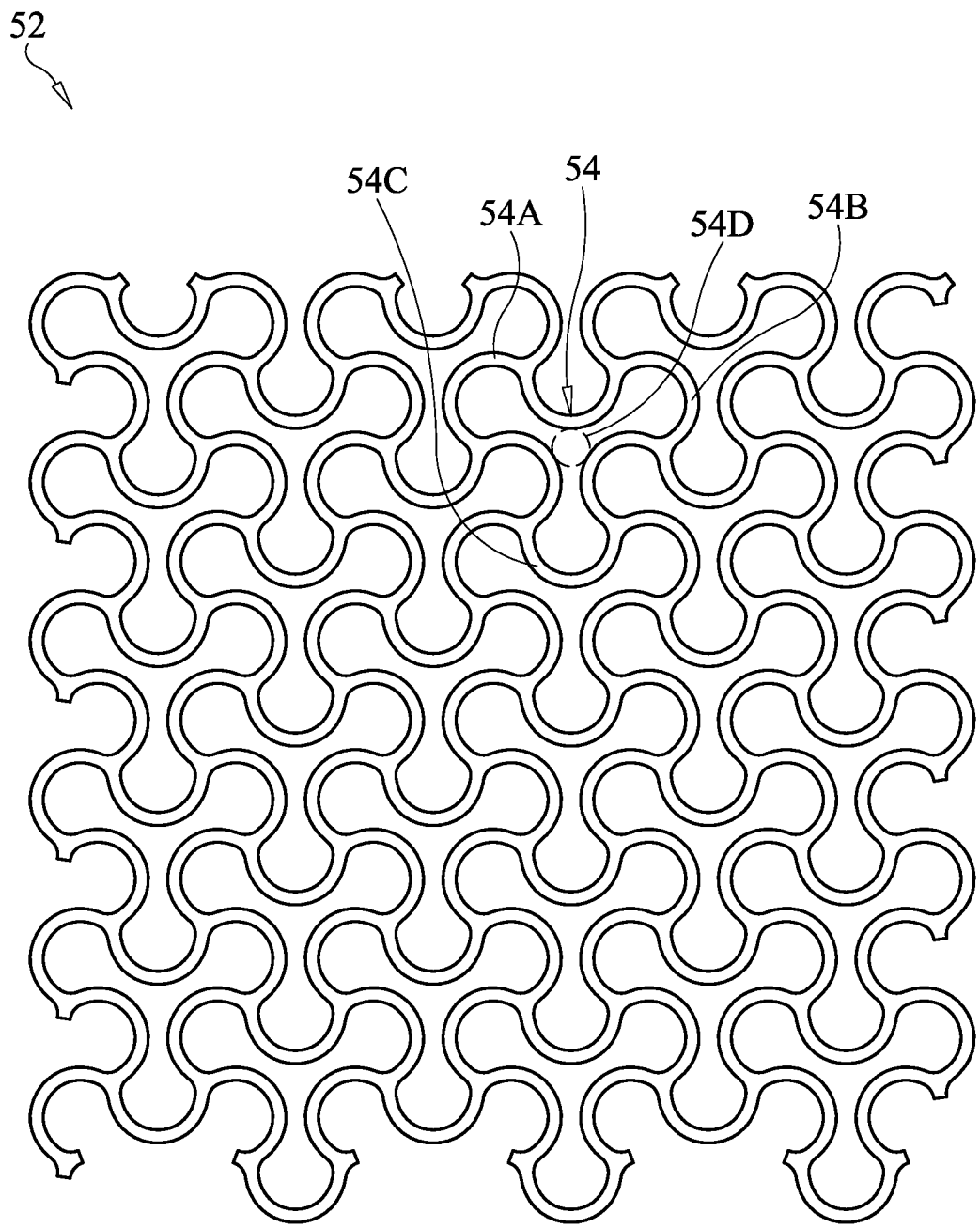
FIG. 5B is an isolated plan view of a flexible open-cell layer utilizing a three-leg open cell geometry in accordance with yet another embodiment of the present invention.
Figure 5C:
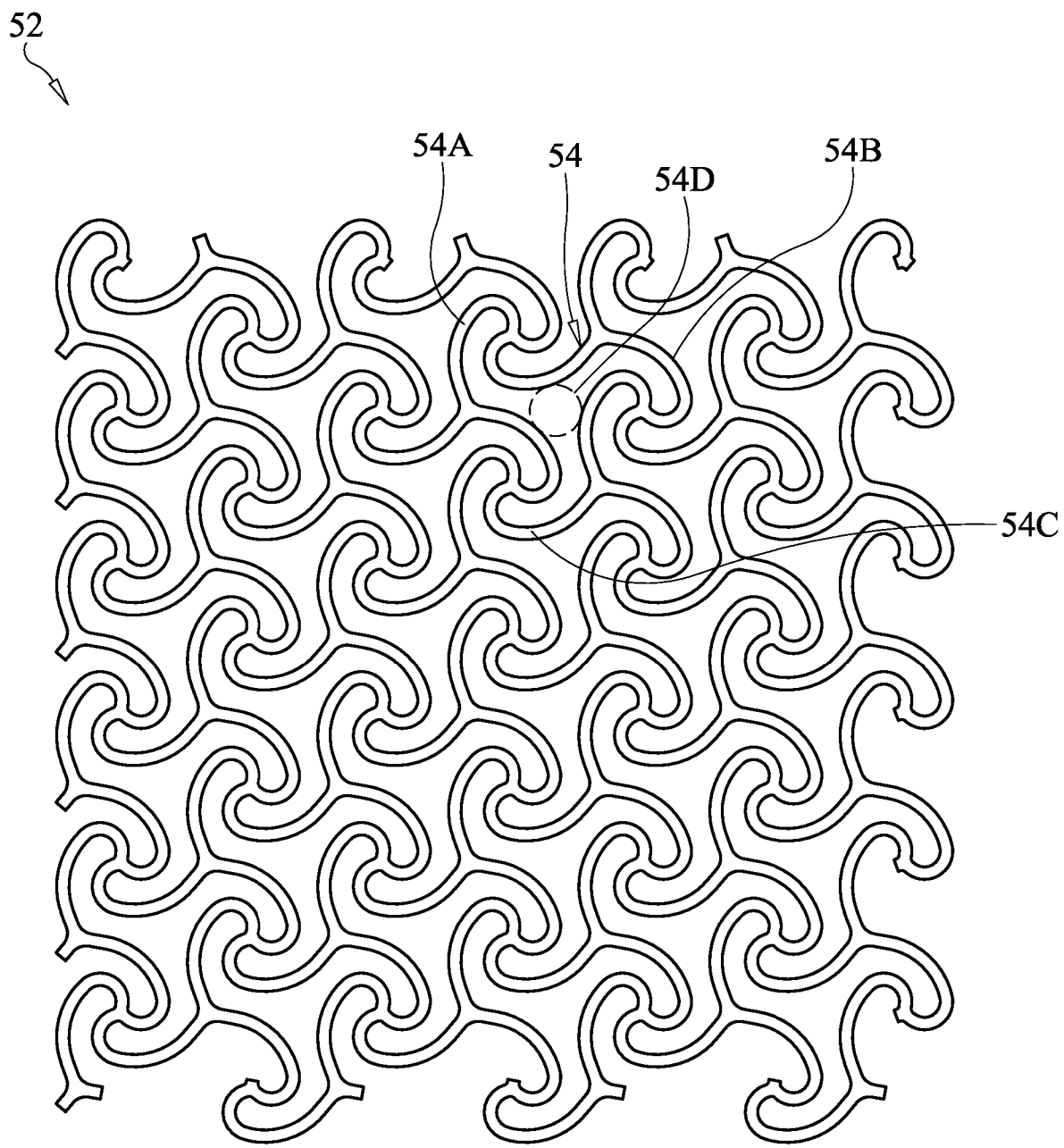
FIG. 5C is an isolated plan view of a flexible open-cell layer utilizing a three-leg open cell geometry in accordance with still another embodiment of the present invention.
Figure 5D:
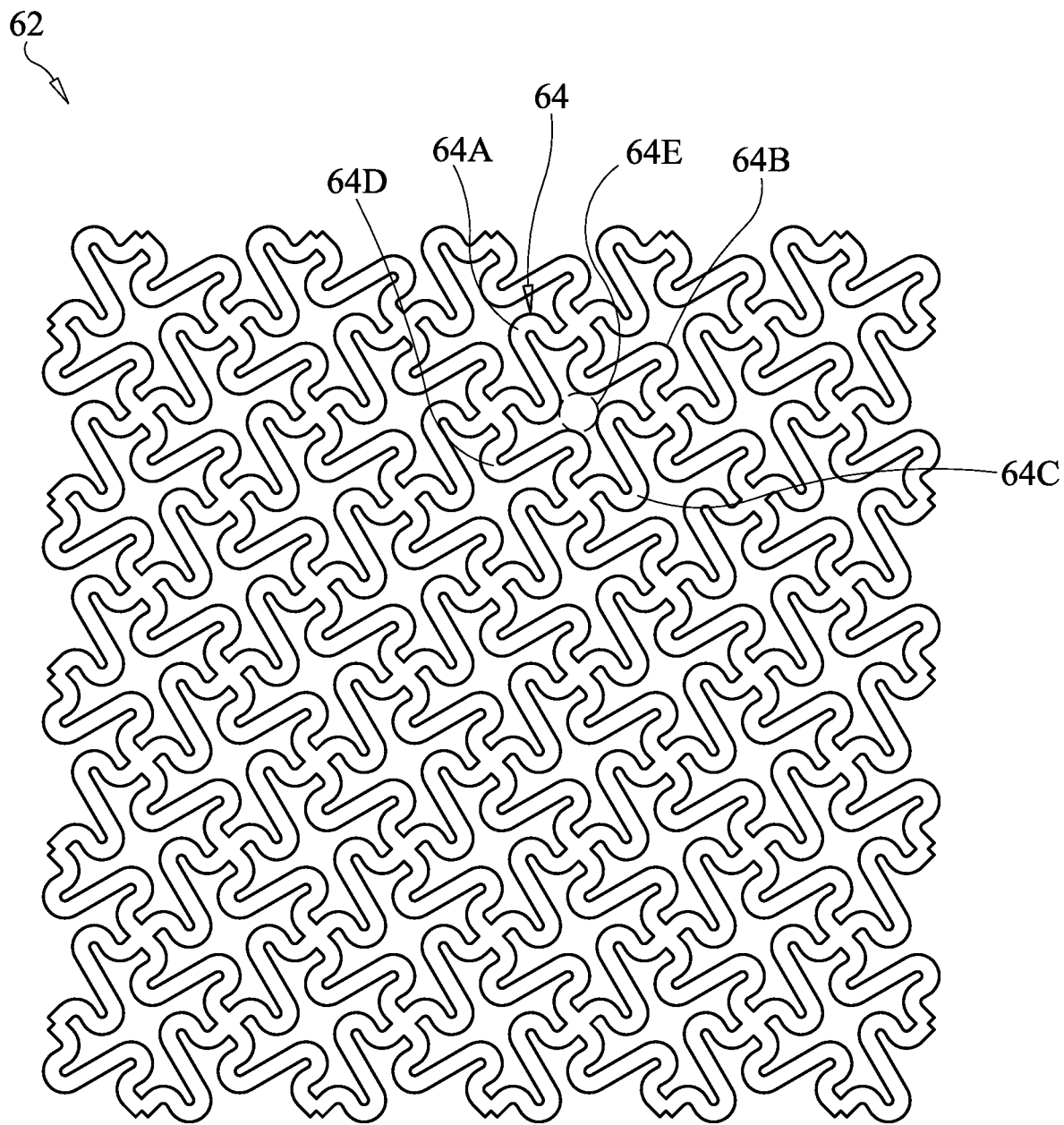
FIG. 5D is an isolated plan view of a flexible open-cell layer utilizing a four-leg open cell geometry in accordance with another embodiment of the present invention.
Figure 5E:
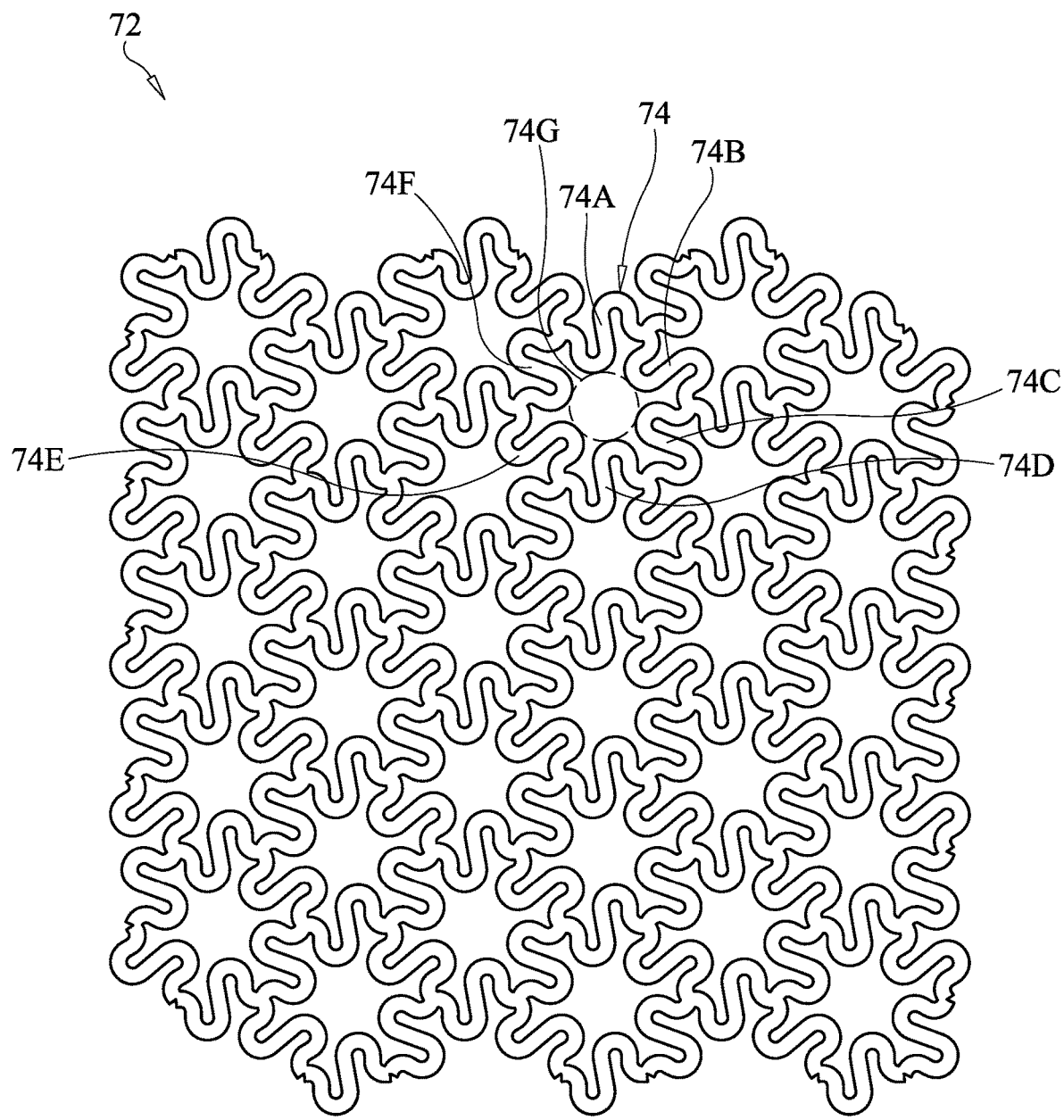
FIG. 5E is an isolated plan view of a flexible open-cell layer utilizing a six-leg open cell geometry in accordance with another embodiment of the present invention.

As mentioned above, the cross-sectional shape of the cells in each of open-cell layers 32 could comprise more complex cross-sectional shapes to enhance the framework's stretchiness without departing from the scope of the present invention. Several non-limiting examples will be described below with reference to FIGS. 5A-5E where, in each example, a flexible open-cell layer is shown in isolation and in a plan view thereof to illustrate the cells' cross-sectional shapes. For simplicity of illustration, no keyway is illustrated in the open-cell layers illustrated in FIGS. 5A-5E. Each of the embodiments is a variation on one of the above-mentioned triangular, rectangular, or hexagonal cross-sectional shapes with the walls of the base shape being non-linear between the shapes' vertices. In general, each variation presents a plurality of identically-shaped legs that extend radially outward from a central region of the shape. More specifically, variations on a triangular-cell cross-section are illustrated in FIGS. 5A-5C. In each of FIGS. 5A-5C, a flexible open-cell layer 52 has cells 54. Each of cells 54 has three identically-shaped legs 54A-54C extending radially outward from the cell's central region indicated by dashed-line circle 54D. In FIG. 5D, a variation on a rectangular-cell cross section is presented by a flexible open-cell layer 62 having cells 64. Each cell 64 has four identically-shaped legs 64A-64D extending radially outward from the cell's central region indicated by dashed-line circle 64E. In FIG. 5E, a variation on a hexagonal-cell cross-section is presented by a flexible open-cell layer 72 having cells 74. Each cell 74 has six identically-shaped legs 74A-74F extending radially outward from the cell's central region indicated by dashed-line circle 74G.

The advantages of the present invention are numerous. Since the composite resists compression in its thickness dimension, it greatly advances the state-of-the art of dive suit materials as the composite will not be subject to depth-based reductions in thermal protection. At the same time, the compression resistance feature means that the composite will be uniformly buoyant at different depths thereby simplifying how a diver plans for the use of dive weights. If the composite is used on underwater vehicles, the composite's compression resistance and uniform buoyancy could simplify the vehicle's use of ballast. The composite's multiple open-cell-layer core stretches, flexes, and inhibits heat transfer through its creation of gas isolation zones thereby making it an ideal choice for use in form-fitting dive suits. Misalignment of cell walls between layers enhances both incompressibility and heat transfer attributes. The uncoupled layers comprising the composite's core enhance the composite's stretching and flexibility by allowing layers 32 and 38 to slide relative to one another in an independent fashion. The composite's key-based coupling allows the composite to be customized for location-based flexibility to suit an application's needs. Still further, the multi-layer core can provide flood protection in the event that an outer layer is damaged and is subjected to flooding, while the inner layer(s) remain undamaged.

Although the invention has been described relative to specific embodiments thereof, there are numerous variations and modifications that will be readily apparent to those skilled in the art in light of the above teachings. For example, microballoons used in the present invention can be filled with a gas selected for its contribution to the composite's thermal conductivity. It is therefore to be understood that, within the scope of the appended claims, the invention may be practiced other than as specifically described.

What is claimed as new and desired to be secured by Letters Patent of the United States is:

1. A thermally-insulating composite, comprising:
    a flexible first skin;
    a flexible second skin; and
    a flexible multi-layer core disposed between said first skin and said second skin, said multi-layer core having
        a plurality of open-cell layers adjacent to one another, each of said open-cell layers including a contiguous framework of open cells, a separating layer of gas impervious material disposed between individual adjacent open-cell layers, and a plurality of keys extending through said multi-layer core, each of said keys uncoupled from said multi-layer core and coupled to said first skin and said second skin.

2. A thermally-insulating composite as in claim 1, wherein said plurality of open-cell layers comprises at least three of said open-cell layers.

3. A thermally-insulating composite as in claim 1, wherein each of said open cells has cell walls, and wherein said cell walls are misaligned between said individual adjacent open-cell layers.

4. A thermally-insulating composite as in claim 1, wherein each of said open cells is filled with a gas.

5. A thermally-insulating composite as in claim 1, wherein each of said open cells is filled with a deformable fill material selected from the group consisting of aerogels, microballoons, and elastic foams.

6. A thermally-insulating composite as in claim 1, wherein each of said open cells has cell walls, wherein said cell walls comprise a polymer with incompressible particles mixed therein, and wherein said incompressible particles are selected from the group consisting of microballoons and aerogel particles.

7. A thermally-insulating composite as in claim 1, wherein said first skin and said second skin are selected from the group consisting of polyurethanes and rubbers.

8. A thermally-insulating composite as in claim 1, wherein each of said keys is made from a material selected from the group consisting of syntactic foams, rubber, and aerogels.

9. A thermally-insulating composite as in claim 1, wherein each of said open cells has a radial cross-sectional geometric shape that includes a plurality of identically-shaped legs extending radially outward from a central region of said geometric shape, and wherein each leg of said identically-shaped legs has non-linear walls.

10. A thermally-insulating composite as in claim 1, wherein said separating layer is selected from the group consisting of hydrophobic materials and compounds having a lubricant mixed therein.

11. A thermally-insulating composite, comprising:
a flexible first skin;
a flexible second skin; and
a flexible multi-layer core disposed between said first skin and said second skin,
said multi-layer core having
a plurality of open-cell layers adjacent to one another, each of said open-cell layers including a contiguous framework of open cells,
a separating layer of gas impervious material disposed between individual adjacent open-cell layers,
a plurality of keyways extending through said open-cell layers and each said separating layer, and
a key disposed in each of said keyways, each said key uncoupled to said open-cell layers and each said separating layer, each said key having a first axial end coupled to said first skin and having a second axial end coupled to said second skin.

12. A thermally-insulating composite as in claim 11, wherein said plurality of open-cell layers comprises at least three of said open-cell layers.

13. A thermally-insulating composite as in claim 11, wherein each of said open cells has cell walls, and wherein said cell walls are misaligned between said individual adjacent open-cell layers.

14. A thermally-insulating composite as in claim 11, wherein each of said open cells is filled with a gas.

15. A thermally-insulating composite as in claim 11, wherein each of said open cells is filled with a deformable fill material selected from the group consisting of aerogels, microballoons, and elastic foams.

16. A thermally-insulating composite as in claim 11, wherein each of said open cells has cell walls, wherein said cell walls comprise a polymer with incompressible particles mixed therein, and wherein said incompressible particles are selected from the group consisting of microballoons and aerogel particles.

17. A thermally-insulating composite as in claim 11, wherein said first skin and said second skin are selected from the group consisting of polyurethanes and rubbers.

18. A thermally-insulating composite as in claim 11, wherein each of said keys is made from a material selected from the group consisting of syntactic foams, rubber, and aerogels.

19. A thermally-insulating composite as in claim 11, wherein each of said open cells has a radial cross-sectional geometric shape that includes a plurality of identically shaped legs extending radially outward from a central region of said geometric shape, and wherein each leg of said identically-shaped legs has non-linear walls.

20. A thermally-insulating composite as in claim 11, wherein said separating layer is selected from the group consisting of hydrophobic materials and compounds having a lubricant mixed therein.

21. A thermally-insulating composite, comprising:
a flexible first skin;
a flexible second skin; and
a flexible multi-layer core disposed between said first skin and said second skin,
said multi-layer core having
at least three open-cell layers adjacent to one another, each of said open-cell layers including a contiguous framework of open cells, wherein each of said open cells has cell walls, and wherein said cell walls are misaligned between individual adjacent open-cell layers,
a separating layer of gas impervious material disposed between and uncoupled from individual adjacent open-cell layers, and
a plurality of keys extending through said multi-layer core, each of said keys uncoupled from said multi-layer core and coupled to said first skin and said second skin.

22. A thermally-insulating composite as in claim 21, wherein each of said open cells is filled with a gas.

23. A thermally-insulating composite as in claim 21, wherein each of said open cells is filled with a deformable fill material selected from the group consisting of aerogels, microballoons, and elastic foams.

24. A thermally-insulating composite as in claim 21, wherein each of said open cells has cell walls, wherein said cell walls comprise a polymer with incompressible particles mixed therein, and wherein said incompressible particles are selected from the group consisting of microballoons and aerogel particles.

25. A thermally-insulating composite as in claim 21, wherein said first skin and said second skin are selected from the group consisting of polyurethanes and rubbers.

26. A thermally-insulating composite as in claim 21, wherein each of said keys is made from a material selected from the group consisting of syntactic foams, rubber, and aerogels.

27. A thermally-insulating composite as in claim 21, wherein each of said open cells has a radial cross-sectional geometric shape that includes a plurality of identically shaped legs extending radially outward from a central region of said geometric shape, and wherein each leg of said identically-shaped legs has non-linear walls.

28. A thermally-insulating composite as in claim 21, wherein said separating layer is selected from the group consisting of hydrophobic materials and compounds having a lubricant mixed therein.

\* \* \* \* \*